J. OLD.
Assignor by mesne assignments to M. J. Old.
PIPE-COUPLING.
No. 7,673. Reissued May 8, 1877.
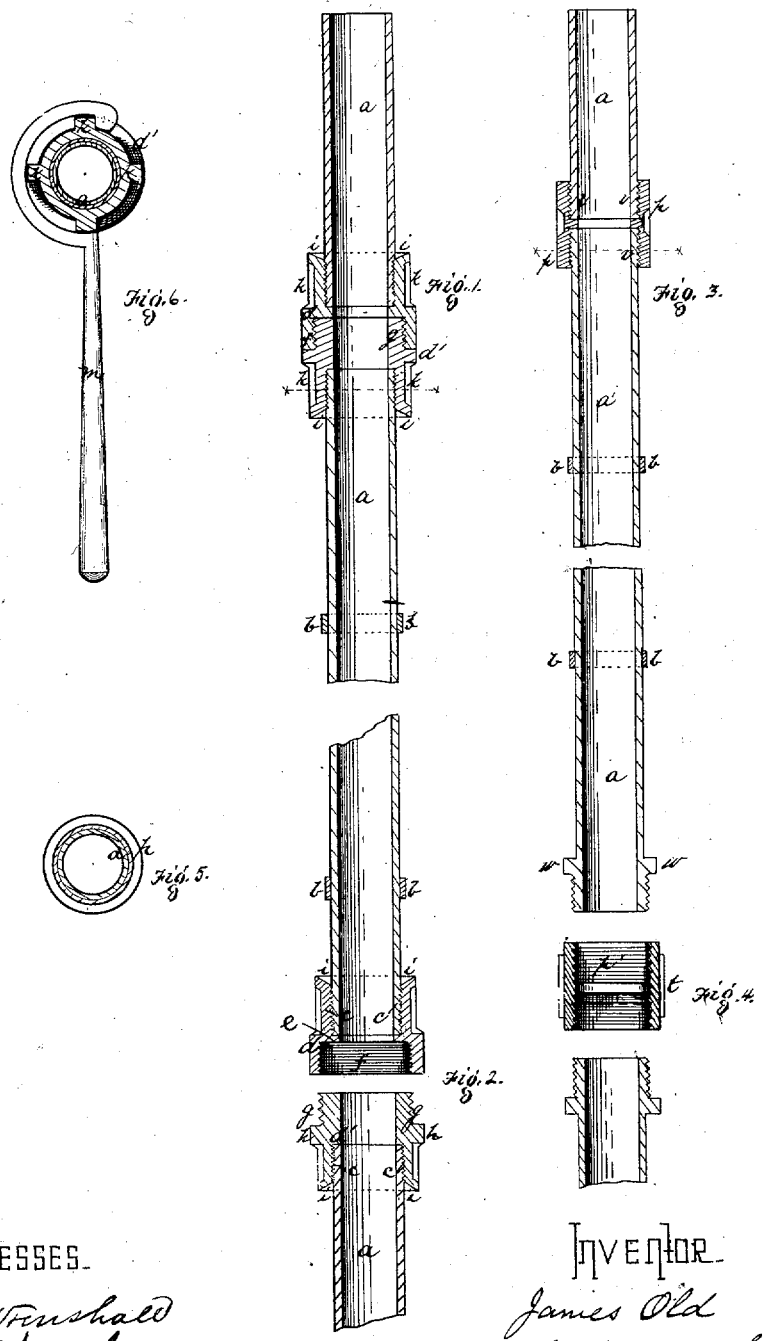
WITNESSES.
R. A. Winshall
J. K. Smith
INVENTOR.
James Old
by Bakewell & Kerr
Atty's

UNITED STATES PATENT OFFICE.

JAMES OLD, OF PITTSBURG, PENNSYLVANIA, ASSIGNOR, BY MESNE ASSIGNMENTS, TO MARTHA J. OLD.

IMPROVEMENT IN PIPE-COUPLINGS

Specification forming part of Letters Patent No. 49,142, dated August 1, 1865; reissue No. 7,673, dated May 8, 1877; application filed April 6, 1877.

*To all whom it may concern:*

Be it known that I, JAMES OLD, of Pittsburg, in the county of Allegheny and State of Pennsylvania, invented a new and useful Improvement in Pipe-Coupling; and I do hereby declare the following to be a full, clear, and exact description thereof, reference being had to the accompanying drawing, forming part of this specification, in which—

Figure 1 is a longitudinal section of a portion of two pieces of tubing, showing the manner of uniting them by means of my improved coupling. Fig. 2 is a longitudinal section of two pieces of tubing detached from each other, in order to show the construction of the coupling. Fig. 3 is a longitudinal section of two pieces of tubing, united by a coupling differing in construction from that shown in Figs. 1 and 2. Fig. 4 represents two pieces of tubing and a coupling for uniting them, differing from either of the couplings shown in Figs. 1 or 3. Fig. 5 is a cross-section through *x x*, Fig. 3. Fig. 6 is a cross-section of the tubing and coupling through *x x*, Fig. 1, showing the mode of turning the coupling by means of a spanner.

In the several figures like letters of reference refer to the similar parts.

Artesian wells and wells bored to a great depth for procuring salt water or oil are usually from four to six inches in diameter, and are sunk frequently four, five, to six hundred feet in the ground. Into these bores metallic pipes are sunk, which are put down in sections, united together, each section having at one end a screw cut on the outside, and at the other end on the inside. These tubes are generally made of copper or wrought-iron. The former are very expensive, and the latter are made very heavy, the iron being usually about a quarter of an inch in thickness, in order to secure the necessary strength. The practical obstacle to the use of thin wrought-iron pipes is the difficulty of attaching the pieces together. A thin wrought-iron pipe will not bear to have a screw cut upon it of sufficient depth to hold securely, and a fine screw, the threads of which are necessarily near together when cut in wrought-iron, is very apt to strip, especially if the pieces to be screwed together are not exactly in the same axial line when the screw-threads begin to take hold of each other. It is, therefore, almost impossible to screw together the sections of thin wrought-iron tubing, where the ends are to be screwed into each other, owing to the difficulty of getting the pieces in exactly the proper relative position necessary, where the screw is fine, to start the screws without the threads crossing each other.

The object of my invention is to overcome these obstacles, and to enable thin wrought-iron pipes to be used as tubing for wells, which I accomplish by the use of my improved coupling, instead of connecting the ends of the tubing immediately together.

As the tubing for a deep well must be let down piece by piece, and the sections united when the tubing is in a vertical position in the bore of the well, it is necessary to provide some means of holding the tubing securely while it is being attached. This is done by means of a clamp passed around the pipe, and in order to give a secure hold, and prevent the tubing slipping, which it is apt to do, owing to its great weight when very long, I shrink or weld onto each of the sections of tubing, near to its upper end, a wrought-iron ring, which makes a projection from the side of the pipe to serve as a rest, under which the clamp may be placed, and thus hold up the tubing securely while another section of the tubing is screwed on or off.

To enable others skilled in the art to construct and use my improvements, I will proceed to describe more particularly its construction and operation.

In the several figures, *a* is a tube or pipe of wrought-iron, about one-eighth of an inch in thickness, and of any convenient diameter. *b b* are wrought-iron rings, which are first heated and then placed over the pipe, one near to the upper extremity of each piece of tubing. As the rings contract in cooling they shrink around the tube, grasping it so tightly as to resist any tendency to slip from the position in which they are placed; or the rings may, if preferred, be welded onto the tube.

At each extremity of the pieces of tubing a screw is cut, with very fine threads, which enter, to a very slight depth, the surface of the iron pipe, as seen at *c c* in Figs. 1 and 2. *d d'* is a coupling, which may be made of brass. Both pieces of coupling *d* and *d'* are cylindrical. (See Figs. 1 and 2.) Each piece *d* and *d'* has a fine female screw cut inside of it to about half its length, the threads of which correspond with the threads of the male screw at the end of the iron tube, which is inserted into the coupling and screwed down against the shoulder *e*, the edges of which correspond with the interior diameter of the tubing. The edge of the coupling, at the end into which the iron tube is inserted, is sloped down toward the center of the coupling, so as to form a gutter all around the tube, as at *i i*, Figs. 1 and 2.

The end of the coupling-pieces *d* and *d'* is soldered to the iron tube all around, the solder entering the gutter *i* and rising up above it around the tube, thus preventing the tube from turning in the coupling, and insuring a firm union of the coupling and tube. One of the pieces of coupling, *d*, has a female screw, *f*, with coarse threads deeply cut into it at the end opposite to that into which the tube is inserted; and the other piece of coupling, *d'*, has a male screw, *g*, with threads corresponding exactly with those of the female screw *f* cut on its outer surface. Below the point where the male screw *g* terminates on the piece of coupling *d'* is a shoulder or flange, *h*, against which the face of the coupling-piece *d* rests, when the pieces of coupling are screwed together. The inner diameter of the lower coupling-piece *d'* corresponds exactly with that of the upper coupling-piece *d*, and of the tubing *a a*, so that when the couplings are united the interior surfaces of the tubing and its coupling are flush, preserving an uniform diameter inside the tube. There is on each section or piece of tubing a male coupling-piece, *d'*, at one end, and a female coupling-piece, *d*, at the other end. When the tube is to be used the couplings *d* and *d'* are screwed together, which is easily done, as the screws are made sufficiently coarse to be easily united without danger of crossing the threads.

On each coupling-piece are formed the lugs *k k*, at uniform distances apart, around its outer circumference. These lugs are projections fro the surface of the coupling, parallel to its cylindrical axis, and may be three, four, or any convenient number. As it is desirable to reduce the exterior diameter of the tubing as much as possible, these lugs may be formed by sinking grooves in the surface of the couplings, leaving the lugs even with the exterior diameter of that part of the female coupling-piece *d*, in which the coarse screw is cut. By means of these lugs *k k* and a spanner, *m*, the tubing is turned on its axis to couple or uncouple it, the spanner being applied as shown in Fig. 6.

It will be observed that a fine screw cut on the iron pipe, by which the coupling-piece *d* or *d'* is attached to it, serves to give a firm and secure hold of the coupling-piece to the iron tubing, which is very necessary, as where the well is very deep there is a great strain on the couplings; but as the connection thus made between the end of the tube and the coupling-piece is not designed to be severed when the tubing is in use, the objection to the employment of a screw of fine thread for the coupling of the tubes, which have to be put together when the tube is being lowered into the well, often by inexperienced hands, does not exist, as the coupling-pieces are carefully attached to the ends of the tubes at the shop where they are manufactured, and then these pieces soldered together so as to prevent any liability to their coming apart when the coupling-pieces *d* and *d'* are being united or separated, when the tubes are being used in the well. The threads of the screws at the extremities of the coupling-pieces *d* and *d'*, by which the separate pieces of tubing are put together, are so coarse as to be easily managed without liability to any crossing of the threads. The rings *b b* serve as rests for the tube on the clamp, as the tube is being lowered, to avoid the necessity of resting the tube on the clamp by the end of the coupling, and sustaining the tube in the well, with its upper end at a suitable height above the surface of the ground for the more easy attachment of the next section or piece of tubing.

Another mode of uniting the pieces of thin wrought-iron tubing is to use, instead of the coupling just described, which is in two pieces, a coupling made in a single piece, (see Figs. 3 and 4,) into either end of which the extremity of a piece of tubing is screwed, the end of the tubing being thickened, so as to allow of cutting a coarse screw on it by welding another thickness of iron onto the end of the tube, or thickening it by staving up the end.

In Fig. 3, *a a'* are two sections or pieces of tubing, united by being each screwed into an opposite end of the sleeve-coupling *p*. This sleeve-coupling is a hollow cylindrical piece of brass, or other metal, with a female screw cut on its inside diameter from each end toward the middle, the screw-threads extending as far as a flange, *q*, which surrounds the interior of the coupling *p*, and against which, on either side, the ends of the tubes *a a'* are screwed, the ends of the tubes and the sides of the flange being turned true, so as to make a face or shoulder for the tubes to press against, and insure a good joint. The screw-threads in this sleeve-coupling correspond with those on the ends of the tubes *a a'*, and are sufficiently coarse to be easily put together. Around this coupling *p*, midway from either end—that is, over the flange *q*—are sunk grooves *r r*, at uniform distances apart, which leave lugs *t t* similar to those on the couplings in Fig. 1, which serve, by aid of a spanner, to turn the coupling, in order to connect or disconnect the tubes. The ends of the tubes *a a'*, which enter the couplings *p*, are thickened sufficiently to admit of cutting coarse screw-threads into its exterior surface, either by welding a belt on the end, or by heating the end of the wrought-iron pipe, and staving it up, as seen at *v*, Fig. 3.

Fig. 4 exhibits a slight modification of the sleeve-coupling, (shown in Fig. 3,) consisting of dispensing with the flange *q*, (seen in the middle of the coupling *p*,) and instead thereof putting a flange on each of the wrought-iron tubes, where the screw-threads cease, against which flange *w*, on each tube, the end or face of the coupling *p'* screws, so as to make a tight joint. This flange *w* on the tube is welded on with the belt, by which the end of the tube is thickened to receive a coarse screw, as before stated. In this case the lugs *t t* should project from the face of the coupling *p'*, so as not to weaken it in the center.

The sleeve-coupling *p* and *p'* (shown in Figs. 3 and 4) is not only adaptable for the purpose of uniting tubing for wells, but would also answer an excellent purpose for connecting pipes in gas or steam fittings.

The great advantage of the sleeve-couplings *p* and *p'* (shown in Figs. 3 and 4) over the socket-joint ordinarily used for connecting pieces of pipe is that the face or ends of the pipe screw up tightly against a flange in the socket, or the face or ends of the socket screw closely against a flange around the pipe, whereby a tight joint is secured; whereas it is usual to depend solely on the exterior surface of pipe fitting closely against the inner surface of the socket, where they are screwed together, and the jarring of the pipe is apt to loosen the screw; but with the use of my improved sleeve-coupling this is not the case, as the end of the pipe or coupling as the case may be, being pressed firmly against the face of a flange, the joint is much more tight and close, and there can be no lateral motion of the pipe in the coupling, which would loosen the joint.

Having thus described my improvement in couplings for metallic pipes or tubing, what I claim as my invention, and desire to secure by Letters Patent, is—

1. The metallic tube or pipe, having the section of a screw-coupling united thereto by means of a fine screw in the pipe or tube and coupling, and solder around the pipe or tube and coupling, substantially as specified.

2. The combination of the metallic tubes, having shoulders or flanges, and a sleeve or coupling, substantially as and for the purpose specified.

3. An externally longitudinally grooved or ribbed sleeve or coupling threaded internally, substantially as and for the purpose specified.

In witness whereof I, the said JAMES OLD, have hereunto set my hand.

JAMES OLD.

Witnesses:
JAMES I. KAY,
F. W. RITTER, JR.